United States Patent

Quinn et al.

[11] Patent Number: 5,754,720
[45] Date of Patent: May 19, 1998

[54] LOW LOSS FIBER OPTIC COUPLER AND METHOD

[75] Inventors: Richard A. Quinn; Christopher D. Robson, both of Horseheads; Latha I. Swaroop, Painted Post; David L. Weidman, Corning, all of N.Y.

[73] Assignee: Corning Incorporated, Corning, N.Y.

[21] Appl. No.: 635,038

[22] Filed: Apr. 17, 1996

Related U.S. Application Data

[63] Continuation of Ser. No. 315,711, Sep. 30, 1994, abandoned.
[51] Int. Cl.⁶ .................. G02B 6/26; G02B 6/42
[52] U.S. Cl. .................. 385/43; 65/409; 65/412
[58] Field of Search .................. 65/409, 410, 411, 65/412; 385/43

[56] References Cited

U.S. PATENT DOCUMENTS

| 4,979,972 | 12/1990 | Berkey et al. | |
|---|---|---|---|
| 5,111,525 | 5/1992 | Hartouni | 385/12 |
| 5,240,489 | 8/1993 | Robson . | |
| 5,251,277 | 10/1993 | Young | 385/42 |
| 5,268,979 | 12/1993 | Weidman | 385/42 |
| 5,295,210 | 3/1994 | Nolan et al. | 385/43 |
| 5,339,372 | 8/1994 | Miller et al. | 385/29 |
| 5,351,325 | 9/1994 | Miller et al. | 385/42 |
| 5,351,326 | 9/1994 | Miller | 385/43 |
| 5,355,426 | 10/1994 | Daniel et al. | 385/42 |
| 5,373,572 | 12/1994 | Arkwright et al. | 385/43 |
| 5,408,554 | 4/1995 | Cryan et al. | 385/43 |
| 5,420,950 | 5/1995 | Koya et al. | 385/43 |
| 5,459,804 | 10/1995 | Stowe | 385/43 |

FOREIGN PATENT DOCUMENTS 58-156917  9/1983  Japan .

*Primary Examiner*—Rodney B. Bovernick
*Assistant Examiner*—Robert E. Wise
*Attorney, Agent, or Firm*—William J. Simmons

[57] ABSTRACT

A method of making 1×2 or 2×2 overclad couplers, switches and the like such that the process is more reproducible and loss characteristics are improved. Such couplers are typically made by inserting the stripped portions of two active optical fibers into a tube, heating the tube midregion to collapse it onto the fibers and stretching the central portion of the collapsed midregion to achieve the desired coupling characteristics. The improvement involves the insertion of one or two spacer fibers into the tube bore along with the active fibers to take up empty space that had been present in tube bore and to prevent an active fiber from sagging and crossing over the other fiber when the tube is heated during the tube collapse step.

10 Claims, 6 Drawing Sheets

LOW LOSS FIBER OPTIC COUPLER AND METHOD

This application is a continuation of application Ser. No. 08/315,711, filed Sep. 30, 1994, now abandoned.

BACKGROUND OF THE INVENTION

Certain types of fiber optic systems require couplers in which at least a portion of the light propagating in one or two optical fibers is coupled to or switched between two output fibers. Possible commercial embodiments of such 1×2 and 2×2 fiber optic couplers include such devices as 3dB couplers, achromatic couplers, taps, wavelength division multiplexers (WDMs), switches and the like. The present invention relates to a cost effective and reproducible method of making such fiber optic couplers such that they exhibit low excess loss and low polarization dependent loss, and such that excess loss and polarization dependent loss are relatively uniform with respect to wavelength.

Excess loss is the total loss of optical power incurred by the signal as it passes through the coupler body. In a 1×2, for example, input power $P_{in}$ is applied to the input fiber and output power $P_{o1}$ and $P_{o2}$ appears at one or both of the output fibers. Excess loss is defined as $-10 \log ((P_{o1}+P_{o2})/P_{in})$. The excess loss may be low for one wavelength range but higher at some other range of wavelengths. The excess loss may be often elevated at wavelengths in the 1500–1600 nm range. This appears to be affected by fiber positioning, bending and stress in the coupling region. This nonuniform relationship between excess loss and wavelength is especially detrimental to achromatic fiber optic couplers which should exhibit low excess loss at two separated wavelength bands.

Polarization dependent loss (PDL), another key coupler parameter, is Characterized as follows. Polarization dependent loss of a particular optical path from input i to output j in a coupler is defined as the difference between the maximum insertion loss for that path, $IL_{ij}$ as measured over all possible input states of polarization and the minimum $IL_{ij}$ for that path over all input states of polarization. The term $IL_{ij}$ is defined as $[-10 \log (P_{oj}/P_{ini})]$, where $P_{oj}$ is the power appearing at output j and $P_{ini}$ is the power applied to input fiber i. In practice, the conceptually simplest measurement is made by taking the linearly polarized light output from a laser and passing it through a half wave plate followed by a quarter wave plate. This light is then input into the coupler, and IL is measured as both waveplates are scanned through all possible combinations of angles. For long length systems, the constraints on this parameter can be very tight. PDL slope (rate of change of PDL with wavelength) determines the PDL which can be obtained over a given passband. Polarization dependence in coupling arises from birefringence in the coupler, which is caused by the radially nonsymmetric shape and/or by residual stresses induced by differences in the physical properties (e.g., viscosity and coefficient of thermal expansion) of the core and cladding of the coupler fibers as well as the properties of he medium surrounding the coupling region The cooling rate of and applied stresses on a glass body also affect residual stress.

Fused fiber couplers have been formed by positioning a plurality of fibers in a side-by-side relationship along a suitable length thereof and fusing the claddings together to secure the fibers and reduce the spacings between the cores. Various coupler properties can be improved by inserting the fibers into a capillary tube prior to heating and stretching the fibers, thereby resulting in the formation of an "overclad coupler".

Overclad couplers of the 1×2 and 2×2 type can be made by inserting two suitably prepared glass optical fibers, each having a core and cladding, into the longitudinal bore of a glass tube such that the ends of each fiber extend beyond one or both of the ends of the tube, depending upon whether a 1×2 or 2×2 is being made. A portion of the coating is removed from each fiber, and the uncoated portions of the fibers are disposed within the tube bore to form a coupler preform. The midregion of the coupler preform is collapsed around the fibers, and the central portion of the midregion is stretched to elongate the fibers and reduce their diameter. Stretching is discontinued when the desired coupling has been achieved. A sealant such as UV curable epoxy is then applied to the ends of the tube bore. The resultant coupler is referred to herein as an overclad coupler.

Overclad coupler process reproducibility and excess loss are significantly impacted by the bending of the fibers when the tubing glass collapses around the fibers and by the reproducibility of the fiber geometry in the coupler preform prior to the stretch step. Polarization dependent lose is significantly impacted by the physical properties of the glass in close proximity to the light guiding fibers.

Heretofore, the process of making low-loss 2×2 couplers has not been completely reproducible since the presence of certain fiber coating in the overclad tube bore necessitates the, use of a relatively large diameter bore. See U.S. Pat. No. 5,240,489. A fiber insertion station is typically employed to assist in the proper positioning of the fibers of 2×2 overclad couplers. One fiber is inserted through the tube and is positioned at one side of the bore. The other fiber is then inserted and positioned at the opposite side of the bore. The fibers are glued to the end portions of the tube in such a manner that openings remain through which the bore can be evacuated. The resultant coupler preform is removed from the insertion station and placed in the coupler draw apparatus. A fiber coating extends a short distance into each end of the bore of the coupler preform. While this ensures that the fibers are properly positioned at the ends of the bore, it leaves an unfilled space in the coupling region of tube bore. A typical coupler fiber has a diameter of 125 μm and a coating diameter of 250 μm. The bore diameter must be at least 375 μm and is usually at least 380 μm to take into consideration coating diameter oversize due to manufacturing variability and/or due to swelling caused by cleaning solvent absorption. With such coupler fibers and bore diameter, there is at least 125 μm of unfilled diameter across the bore in the coupling region. Depending on the location of the fibers within the bore and upon such factors as twist, tension, and the like, during the tube collapse step, the resultant couplers can exhibit high variability and high excess loss.

In the aforementioned 2×2 process, the relatively large size of tho overclad tube bore affects excess loss. In an attempt to reduce excess loss by reducing hole size, a process was employed that used fibers the coating thickness of which was less than standard coating thickness (see U.S. Pat. No. 5,131,735). The coupler fiber was 125 μm single-mode fiber having 170 μm diameter coating. The tube had a diamond-shaped hole, each side of the diamond having a length of 310 μm. Coating was removed from the central portion of each fiber, and they were simultaneously pulled through the bore, the coatings being wedged in both ends of the bore. These special non-standard fibers are difficult to make and commercially unattractive.

As disclosed in U.S. Pat. No. 4,979,972, the bore diameter of the overclad tube used for forming 1×2 couplers can be smaller than the bore diameter of the tube used for forming the aforementioned 2×2 couplers. In the 1×2 process, only one coated portion of fiber is pulled through the tube bore. Only the stripped end of the second fiber is inserted into the bore. The bore merely needs be large enough to receive the two bare fibers. When the aforementioned topical 125 µm diameter coupler fibers are employed, the bore diameter must be at least 250 µm (twice the 125 µm fiber diameter) and is typically 268 µm to take into consideration the aforementioned possible coating diameter oversize. Because of the relatively small bore diameter, couplers of the 1×2 configuration are relatively reproducible, and they exhibit low excess loss, usually 0.2 dB or lower. Because even in this case, allowing enough tolerance for the fiber coating requires that the bore diameter must be slightly larger than the minimum necessary to accomodate roe two glass fiber elements, this coupler may also be susceptible to the same types of misalignment, bending, and twist mechanisms which affect the 2×2 coupler, although generally less so.

SUMMARY OF THE INVENTION

An object of the invention is to provide a method of making 1×2 and 2×2 overclad fiber optic couplers such that excess loss, excess loss slope, polarization dependent loss and/or PDL slope are reduced. Another object is to provide a reproducable method for making 1×2 and 2×2 overclad fiber optic couplers. A further object is to provide improved 1×2 and 2×2 overclad fiber optic couplers which are characterized in, that excess loss, excess loss slope, polarization dependent loss and/or PDL slope are reduced.

In accordance with this invention, a fiber optic coupler is formed by assembling a coupler preform including first and second active optical fibers and N spacer fibers, where N is 1 or 2. The optical fibers each have a core surrounded by a cladding, and the spacer fibers have a substantially uniform composition. The active fibers and the spacer fibers extend in a substantially parallel array. The midregion of the coupler preform is heated to fuse the fibers, and the central portion of the midregion is stretched to reduce the diameter thereof.

In one embodiment, the step of assembling comprises inserting into the longitudinal bore of a glass tube the first and second active optical fibers and the spacer fibers such that all of the fibers extend through the midregion of the tube. The step of heating comprises heating the midregion of the tube to collapse it onto the fibers.

The resultant fiber optic coupler comprises first and second optical fibers, each having a core and a cladding, the optical fibers being fused together along a portion of the lengths thereof to form a coupling region, and N spacer fibers of substantially uniform composition fused to the optical fiber in the coupling region.

In that embodiment wherein the coupler is formed with an overclad tube, the coupler comprises an elongated body of matrix glass having first and second opposed ends and a midregion. The first and second active optical fibers and the N spacer fibers extend longitudinally through the body. The midregion of the body is fused to the spacer fibers and to the optical fibers. The diameter of the central portion of the midregion and the diameters of the optical fibers and the spacer fibers in the central portion of the midregion are smaller than the diameters thereof at the ends of the body.

DETAILED DESCRIPTION

The drawings are not intended to indicate scale or relative proportions of the elements shown therein.

In accordance with the present invention, one or two spacer fibers, which have substantially uniform composition, are inserted, in addition to the active, core containing fibers, into the overclad tube bore to force the two active fibers to extend through the coupling region in a parallel, contiguous fashion.

1×2 Coupler Embodiment

Figure 1:
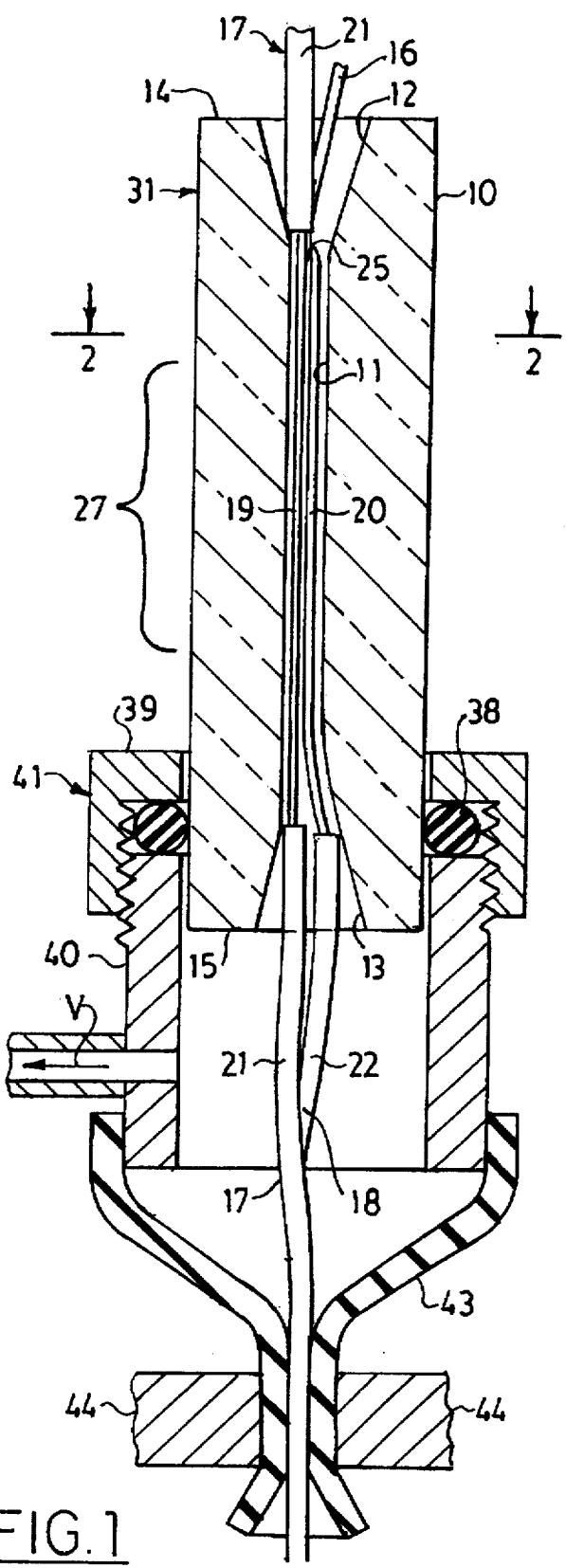
FIG. 1 is a cross-sectional view of a 1×2 overclad coupler preform.

A first embodiment pertains to an improved method of making 1×2 fiber optic couplers. Tube 10 (FIG. 1) has a longitudinal bore 11 and tapered apertures 12 and 13. Although tapered apertures are preferred for the purpose of facilitating fiber insertion, they are not a necessity. Bores of circular or non-circular cross-section can be employed. The softening point temperature of tube 10 or at least the inner portion thereof should be lower than that of the fibers that are to be inserted therein. Suitable tube compositions are $SiO_2$ doped with 0.2 to 25 wt. % $B_2O_3$ and $SiO_2$ doped with 0.1 to approximately 2.5 wt. % fluorine. Glasses comprising silica and combinations of these dopants can also be employed. Glasses having suitable properties but having compositions other than those mentioned above can also be employed. As disclosed in U.S. Pat. No. 5,251,277, tube 10 can comprise inner and outer regions, the softening point temperature of the inner region being greater than that of the outer region.

Coated fibers 17 and 18 comprise glass fibers 19 and 20, respectively, each having a core and a cladding and each having a protective coating 21 and 22, respectively. The refractive index of the fiber claddings is less than that of the fiber cores and is greater than that of the inner region of tube 10. A portion of the coating intermediate the ends of coated fiber 17 is removed for a distance slightly longer than the length of bore 11 but shorter than the length of tube 10. The coating is removed from the end of coated fiber 18. The end of glass fiber 20 can be provided with an antireflection termination by a technique disclosed in U.S. Pat. No. 4,979,972, which is incorporated herein by reference.

After the fibers are cleaned, coated fiber 17 can be inserted through bore 11 until the uncoated section thereof is situated just beyond tube end 15. The uncoated portion of coated fiber 18 can be held adjacent the uncoated portion of coated fiber 17, and both fibers can be moved together toward tube end 14 until the coating end regions, which are adjacent one another, become situated in tapered aperture 13. Alternatively, the stripped end of coated fiber 18 can be inserted after the stripped portion of coated fiber 17 has been positioned in bore 11. When properly inserted in the tube bore, the uncoated portion of coated fiber 17 is disposed intermediate end surfaces 14 and 15, the uncoated portion of coated fiber 17 preferably being centered within bore 11. Fiber end 25 preferably does not extend beyond tube end 14 but is rather located between midregion 27 and end 14 of tube 10.

Figure 2:
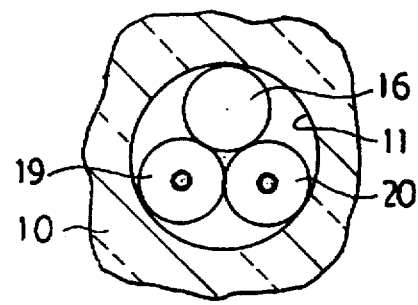
FIG. 2 is a cross-sectional view taken along lines 2—2 of FIG. 1.

In accordance with this invention N spacer fibers are also inserted into bore 11, N being 1 or 2. In the embodiment shown in FIGS. 1 and 2, a single spacer fiber 16, having the same diameter as fibers 19 and 20, is employed. Fiber 16 can be inserted either from end 15 or end 14 of tube 10. However, it has been found that insertion of fiber 16 into end 14 (opposite the end from which coated Fiber 18 extends) facilitates later processing steps. Fiber 16 can be inserted either before or after fiber 20. Fiber 16 has no light guiding core, and its composition is such that its physical characteristics (refractive index, viscosity, thermal coefficient of expansion and the like) are preferably similar to those of the inner region of tube 10; indeed, it can have the same composition as the inner region of that tube. The index of refraction of fiber 16 is less than that of the cladding of active fibers 19 and 20; if its index of refraction were greater than that of the active fiber claddings, the resultant coupler would exhibit nonadiabatic loss. An index of refraction less than that of the inner portion of tube 10 may also lead to increased coupler loss.

When a 1×2 coupler is formed from standard 125 μm outside diameter optical fibers, the diameter of the bore is typically 268 μm when no spacer fiber is employed. Fabricating the 1×2 coupler using tubing having a bore size slightly larger than 272 μm bore size allows the use of a 125 μm outside diameter spacer fiber, and this in turn allows significantly tighter geometric tolerances on the materials and thus the fiber placement. Furthermore, in some cases, the addition of a spacer fiber in a 1×2 coupler (as well as a 2×2 coupler) significantly decreases the PDL slope in the finished coupler. This is believed to be because the spacer fiber significantly lowers the stress distribution in the vicinity of the light carrying fibers. It appears that, when a spacer fiber is used, the fibers are, on average, straighter in the coupling region, and there is little, room for microbending and macrobending of the fibers; loss associated with such bending is therefore eliminated.

Figure 3:
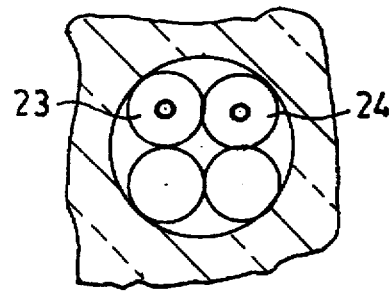
FIGS. 3–5 are cross-sectional views of other configurations of active optical fibers and spacer fibers.
Figure 4:
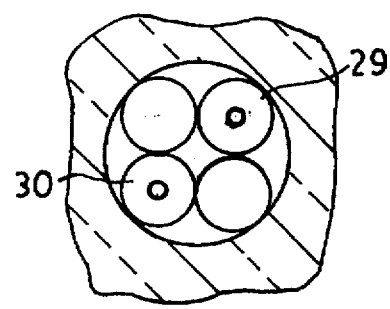
Figure 5:
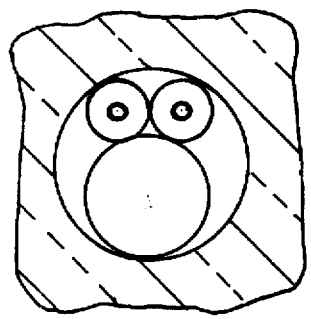

An improvement in process reproducibility and a reduction in loss can also be obtained by adding two spacer fibers to the tube bore, as illustrated in FIGS. 3 and 4. The arrangement of FIG. 3 is preferred over that of FIG. 4 since the two active fibers 23 and 24 are touching in FIG. 3 whereas active fibers 28 and 29 are slightly separated in FIG. 4. Moreover, the spacer fiber or fibers do not have to be the same diameter as the active fibers. The spacer fiber or fibers can be larger than the active fibers as shown in FIG. 5, or they can be smaller than that of the active fibers. If two spacer fibers are employed, their diameters need not be identical.

Figure 6:
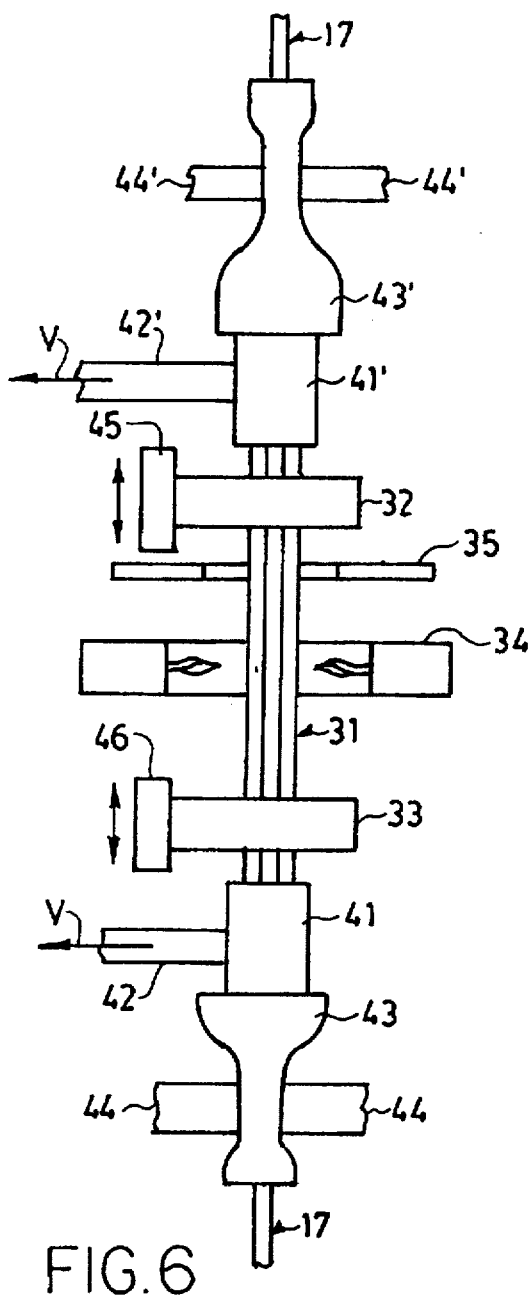
FIG. 6 is a schematic illustration of an apparatus for collapsing a coupler preform tube and drawing the midregion thereof.

Apparatus for collapsing and stretching the resultant preform 31 is shown in FIG. 6. Chucks 32 and 33, which secure preform 31 in this apparatus, are mounted on motor controlled stages 45 and 46, respectively, which are preferably controlled by a computer. Heat shield 35 protects the apparatus located above ring burner 34. Preform 31 is inserted through ring burner 34, is clamped to the draw chucks, and vacuum attachments 41 and 41' are attached to the ends thereof. Vacuum attachment 41, which is shown in cross-section in FIG. 1, may comprise a tube 40, a collar 39 threaded thereon, and an O-ring 38 disposed between the collar and tube. After vacuum attachment 41 is slid over the end of tube 10, collar 39 is tightened, thereby compressing O-ring 38 against the tube. Vacuum line 42 is connected to tube 40. One end of a length of thin rubber tubing 43 is attached to that end of vacuum attachment 41 that is opposite preform 31; the remaining end of the tubing extends between clamp jaws 44. Upper vacuum attachment 41' is similarly associated with line 42', tubing 43' and clamp jaws 44'. The coated portions of the fibers extent from tubing 43 and 43'.

Tube 10 can be secured by chucks 32 and 33 prior to the fiber insertion step. While tube 10 is supported vertically by the chucks, the fibers are inserted as described above. The fibers extending from both ends of the tube are threaded through their respective vacuum apparatus, and vacuum attachments 41 and 41' are connected to the tube. Alternatively, the fibers can be threaded through and into tube 10 offline (prior to securing tube 10 in the chucks, and the fibers can be tacked to the tube by a small amount of glue that is placed such that it does not interfere with the establishment of a reduced pressure within the tube bore. Vacuum is applied to bore 11 by clamping jaws 44 and 44' on tubing 43 and 43'.

Figure 7:
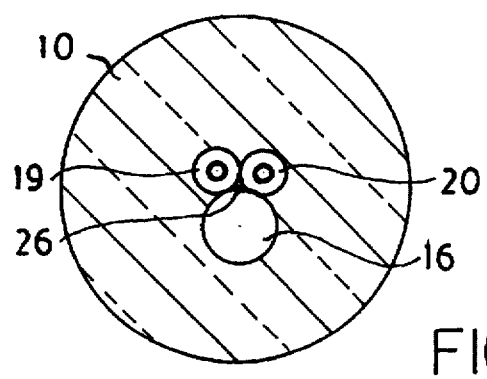
FIG. 7 is a cross-sectional view of the tube midregion after the tube collapse step.

The flame from ring burner 34 heats tube 10 for a short period of time, typically about 25 seconds, to increase the temperature of tube midregion 27. With the assistance of the differential pressure on the tube, the tube collapses onto fibers 16, 19 and 20 and urges them into mutual contact. The tube matrix glass surrounds the fibers and fills the bore to form the structure shown in FIG. 7. Fibers 16, 19 and 20 may incompletely fuse, thereby resulting in an air line 26 after the tube collapse step; this airline can carry over during the stretch step into the final product. In some embodiments the fibers fuse together and eliminate this airline. Midregion 27, the central portion of which forms the coupling region of the resultant coupler, becomes a solid region wherein substantially the entire lengths of fibers 16, 19 and 20 are in mutual contact. The longitudinal length of the collapsed region depends upon the temperature and time duration of the flame, the thermal conductivity of the glass tube, and the amount of vacuum applied.

After the tube cools, the flame is reignited, and the center of the collapsed region is reheated to the softening point of the materials thereof. The flame duration for the stretch process is usually between 10 and 20 seconds, depending upon the desired coupler characteristics. Because of the relatively short duration of the reheating step, only the central portion of the collapsed midregion is stretched, thus ensuring that the coupling region of the fibers will be embedded in the matrix glass of the capillary tube. After the collapsed tube is reheated, the flame is extinguished and stages 45 and 46 pull in opposite directions until the coupler length has been increased by a predetermined amount to bring the fiber cores closer together alone a distance sufficient to accomplish a predetermined type of coupling. The diameter of midregion 27 is reduced as illustrated by region 51 of FIG. 8. The diameter of drawn down region 51 depends upon various fiber and operational parameters. The ratio of the drawn down diameter of region 51 to the starting diameter of midregion 27 (the draw down ratio) is determined by the optical characteristics of the particular device being made.

The amount of stretching to which the coupler preform must be subjected to achieve a given type of coupler is initially determined by injecting light energy into the input fiber of a coupler preform and monitoring the output power at the output fibers during the stretch operation. The predetermined ratio of the dynamic output powers from the two fibers can be used as an interrupt to cause stages 45 and 46 to stop pulling the sample. After having determined the proper stretching distance to achieve predetermined coupling characteristics, the apparatus can be programmed to move the stages that proper stretching distance during the fabrication of subsequent couplers that are to have said predetermined characteristics.

Figure 8:
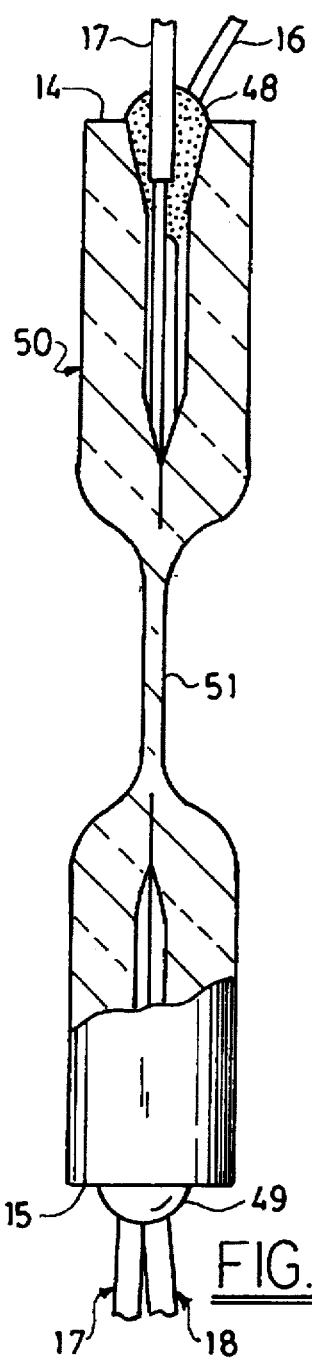
FIG. 8 is a partial cross-sectional illustration of a fiber optic coupler after it has been drawn down (stretched) and sealed at its ends.

The vacuum lines are removed from the resultant coupler, and quantities 48 and 49 of glue are applied to the ends of the capillary tube (FIG. 8). The uncollapsed regions of the tore can be evacuated through hollow filaments (not shown) to draw the glue to the desired location in the bore. Glue 48 and 49 increases the pull strength of the fiber pigtails and produces a hermetic seal. Spacer fiber 16 (as well as the hollow filaments) can be broken of at the surface of the glue. The resultant fiber optic coupler 50 of FIG. 8 functions to couple a signal propagating in the sole optical fiber at end 14 to the two optical fibers extending from end 15.

Examples of 1×2 Couplers

Figure 9:
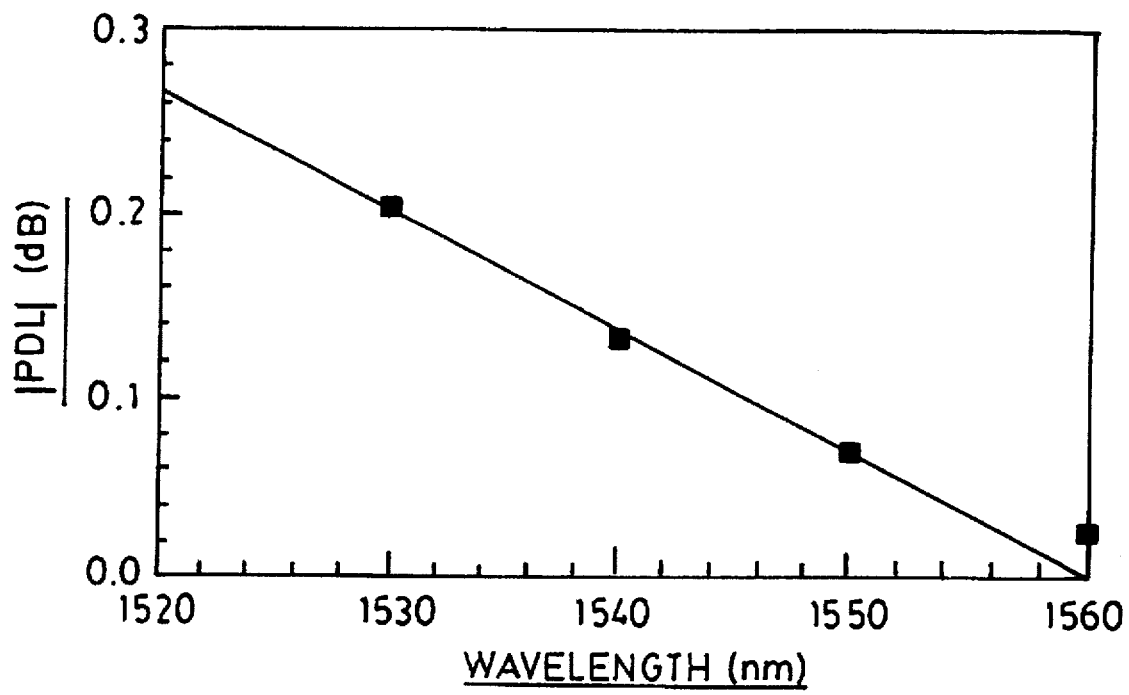
FIG. 9 is a graph of polarization dependent loss plotted as a function of wavelength for a 1×2 WDM coupler.

A 1×2 coupler was made in accordance with the above-described method. Tube 10 had an inner region of $SiO_2$ doped with 2 wt. % $B_2O_3$ and 2 wt. % fluorine and an outer region of $SiO_2$ doped with 8 wt. % $B_2O_3$ and 1 wt. % fluorine. The radius of transition between the two regions was 0.4 mm. Tube 10 had a length of 32 mm, an outside diameter of 2.6 mm and a bore diameter of 277 µm. Coated fibers 17 and 18 consisted of 125 µm outside diameter single-mode optical fibers having 250 µm diameter acrylate coatings. Each of these fibers was a dispersion shifted fiber of the type taught in U.S. Pat. No. 4,715,679. A 30 mm long portion of coating 21 was stripped from coated fiber 17, and a 22 mm long portion of coating 22 was stripped from the end of coated fiber 18. Spacer fiber 16 had a length of about 30 mm, an outside diameter of 125 µm, and it was formed of $SiO_2$ uniformly doped with 2 wt. % $B_2O_3$. Coupler preforms were assembled and stretched as described above. One group of 1×2 couplers made by this method were intended to function as 1480/1558 nm WDM (wavelength division multiplexer) couplers which functioned such that when signals at 1480 nm and 1558 nm were fed to the input fiber, the 1480 nm signal appeared at one output fiber and the 1558 nm signal appeared at the either output fiber). The draw fabrication conditions were exactly the same as those used for 1480/1558 nm WDM couplers made without spacer fiber 16, except for a slight increase in length of stage motion (total stretch) during taper formation of the couplers having a spacer fiber. Specifically, the collapsed coupler preform was stretched 3.36 cm when the spacer fiber was used. These couplers were fabricated to function as 1480/1558 nm WDM couplers, although the wavelength of maximum coupling was not adjusted to exactly correspond to 1558 nm because only slope effects were being investigated. FIG. 9 shows the absolute value of the polarization dependent loss as a function of wavelength measured in a coupler fabricated in accordance with this example. The measured slope was 0.0067 dB/nm. Excellent excess loss (typically under 0.1 dB) has been observed in these couplers.

Typical 1480/1558 WDM couplers fabricated from the same tube and two dispersion shifted single-mode fibers (but no spacer fiber) typically exhibited a 0.048 dB/nm PDL slope and an excess loss under 0.3 dB.

Similar improvements in polarization dependent loss have been seen in 1310/1550 WDMs made with the same materials.

When WDM couplers were formed in accordance with the above described specific example except that the spacer fiber composition was $SiO_2$ doped with 0.3 wt. % $B_2O_3$, the PDL slope was typically 0.01 dB/nm, and the excess loss around 0.5 dB. The more highly doped spacer fiber thus appears to be preferable for this application, although different applications may require different doping levels for optimum performance.

Low loss 1×2 achromatic couplers having spacer fibers were also made with other types of active fibers including standard single-mode fibers and chlorine-doped cladding single-mode fibers. These couplers also exhibited improved polarization dependent loss and excess loss characteristics.

Employing a spacer fiber is also advantageous in that it facilitates the threading of the coated fiber through the tube bore. In the conventional method (having no spacer fiber), the tube bore is made only slightly larger than twice the diameter of the two active fibers. For example, the tube bore diameter might be 268 µm for the above described 125 µm diameter fibers. By choosing a hole diameter slightly larger than 272 µm and adding a 125 µm diameter spacer fiber, the process stability and loss are improved as described above. Also, the larger hole size makes fiber coating insertion easier in the case when the coating is oversized either because of manufacturing variability or because of swelling due to solvent absorption.

2×2 Coupler Embodiment

Figure 10:
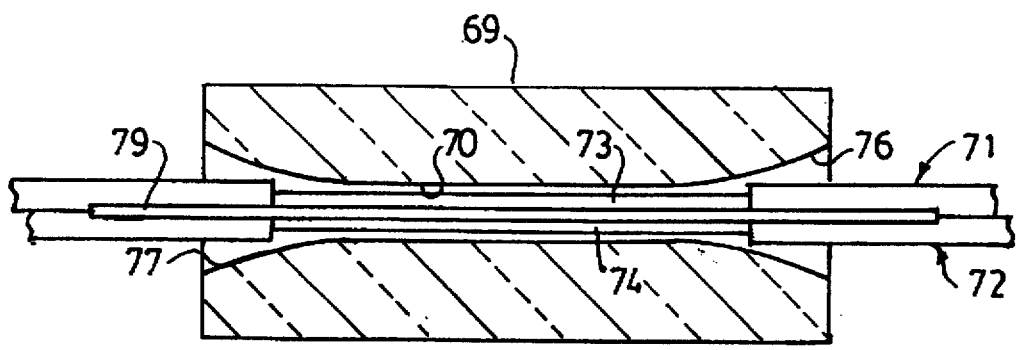
FIG. 10 is a cross-sectional view of a 2×2 coupler preform.

A second embodiment pertains to an improved method of making 2×2 fiber optic couplers. This method is similar to the above-described method for forming 1×2 couplers except for the preparation of the active fibers. Referring to FIG. 10, the central regions of two coated active optical fibers 71 and 72 are stripped of coating material. The fibers are inserted into bore 70 of tube 69 until the bare fibers 73 and 74 extend through the bore, the ends of the coated portions extending into tapered apertures 76 and 77. Spacer fiber 79 is then inserted into the bore. Fiber 79 can extend entirely through bore 70 and apertures 76 and 77, but it is only required that fiber 79 extend through the tube midregion, whereby it can properly position the fibers during the tube collapse step.

The fibers can be inserted into the tube before or after the tube has been placed in chucks 32 and 33 of the apparatus of FIG. 6. Coupler fabrication steps are similar to those described above.

Examples of 2×2 Couplers

A 2×2 achromatic coupler was made in accordance with the above-described method. Tube 10 had an inner region of $SiO_2$ doped with 2 wt. % $B_2O_3$ and an outer region of $SiO_2$ doped with 8 wt. % $B_2O_3$. The radius of transition between the two regions was 0.4 mm. One of the active coupler fibers was a standard step index single-mode fiber, and the other fiber was a similar fiber except that its cladding was doped with an amount of chlorine sufficient to increase the refractive index thereof to a value higher than that of the cladding of the standard fiber. This type of achromatic coupler is disclosed in U.S. Pat. No. 5,044,716 which is incorporated herein by reference. Tube 10 had a length of 32 mm, an outside diameter of 2.6 mm and a bore diameter of 380 µm. Coated fibers 71 and 72 consisted of 125 µm outside diameter single-mode optical fibers having 250 µm diameter acrylate coatings. A 30 mm long portion of coating was stripped from each coated fiber. Spacer fiber 79 had a length of about 40 mm, and an outside diameter of 242 µm. The composition of the spacer fiber was $SiO_2$ doped with 2 wt. % $B_2O_3$, the dopant being uniformly distributed throughout the fiber. A cross-sectional view of the bore of the resultant coupler preform was of the type illustrated in FIG. 5. Coupler preforms were assembled and stretched as described above to form 3 dB splitters. A cross-sectional view of the coupling region of the resultant coupler is similar to the view illustrated in FIG. 7. An airline extended between the two active fibers and the spacer fiber.

Figure 11:
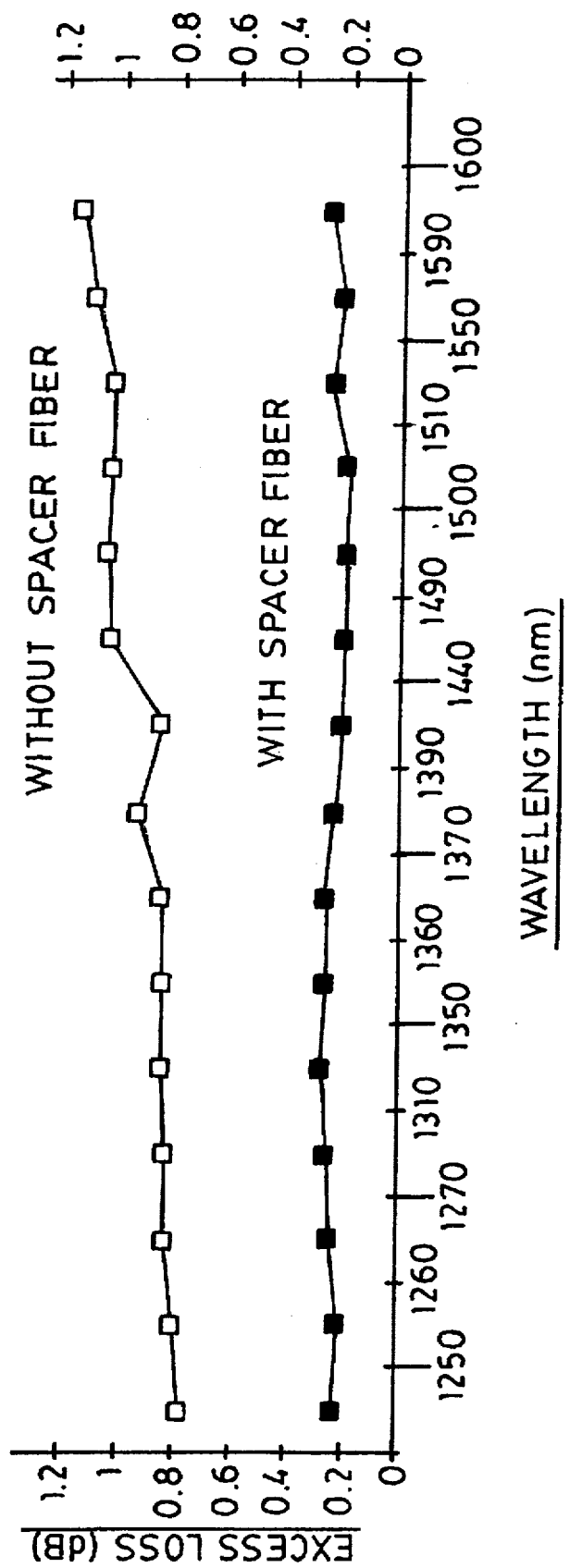
FIGS. 11 and 12 are graphs of excess loss plotted as a function of wavelength for 2×2 3 dB splitters and 2×2 switches, respectively.

FIG. 11 shows the spectrum of an achromatic 2×2 3 dB splitter made by the above-described 2×2 method. The typical excess loss for splitters formed with spacer fibers is between 0.2 and 0.3 dB between 1250 nm and 1600 nm. The typical excess loss for splitters formed without spacer fibers is between 0.5 and 1.0 dB between 1250 nm and 1600 nm.

Figure 12:
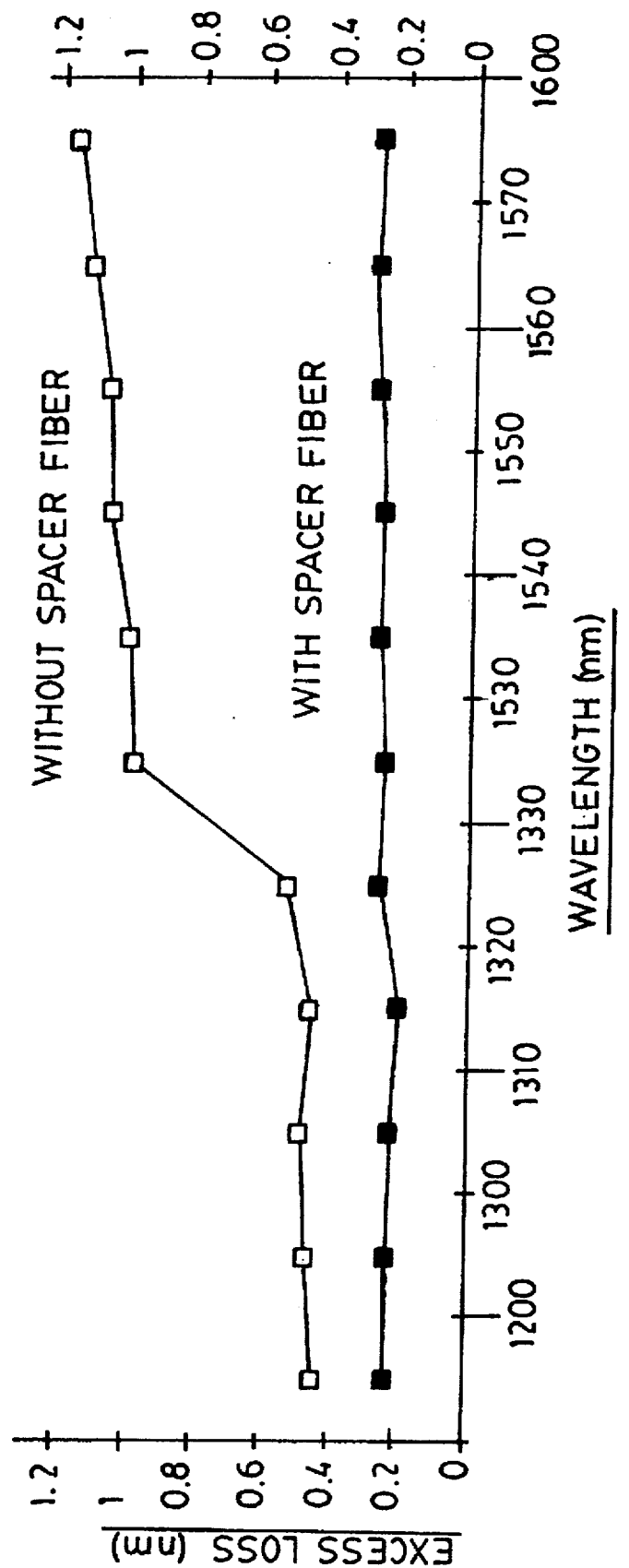

A 2×2 switch coupler (see, for example, U.S. Pat. No. 5,146,519) was formed by a method similar to the above-described 2×2 method. Both fibers were standard single-mode fibers. The spectrum of the resultant switch coupler is shown in FIG. 12. The typical excess loss for splitters formed with spacer fibers is between 0.2 and 0.3 dB between 1250 nm and 1600 nm. The typical excess loss for splitters formed without spacer fibers is between 0.5 and 1.0 dB between 1250 nm and 1600 nm.

Figure 13:
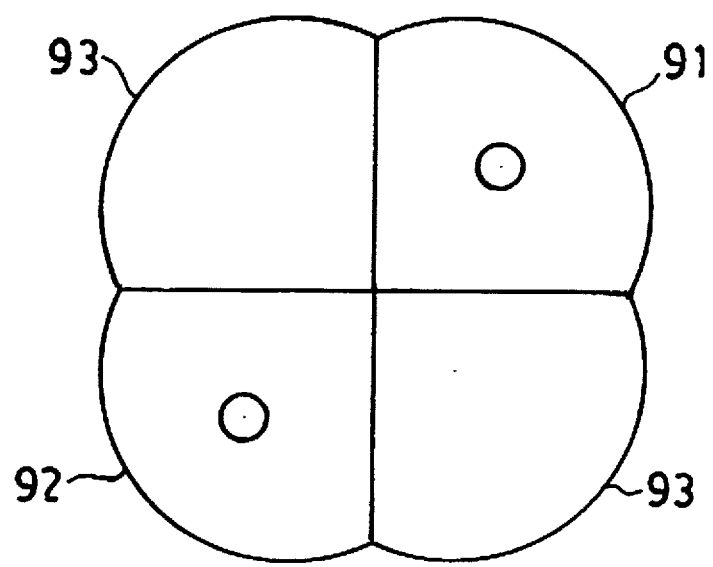
FIG. 13 is a cross-sectional view of a fused fiber coupler incorporating the principles of the invention.

It is expected that the principles of the present invention would also apply to fused fiber couplers (having no overclad tube) by first fusing and stretching two optical fiber 91 and 92 that include a core and cladding along with one or two spacer or dummy fibers 93 that have no cores. Such couplers can be made in accordance with the teachings of U.S. Pat. No. 4,591,372 which is incorporated herein by reference. The cross-sectional configuration of the resultant coupling region is shown in FIG. 13. It is expected that loss and PDL characteristics of this coupler may be improved by the addition of fibers 93.

What is claimed is:

1. A method of making a fiber optic coupler comprising the steps of assembling a coupler preform consisting of first and second active optical fibers and one spacer fiber, said optical fibers each having a core surrounded by a cladding, and said spacer fiber having a substantially uniform composition, said active fibers and said spacer fiber are arranged in a triangular array, wherein the step of assembling further comprises inserting into the longitudinal bore of a glass tube said first and second active fibers and said spacer fiber such that all of said fibers extend through the midregion of said tube, and wherein the refractive index of said spacer fiber is greater than the refractive index of that portion of said tube adjacent said bore, heating a midregion of said coupler preform to fuse said fibers, wherein the step of heating further comprises heating said tube to collapse said tube midregion onto said fibers, and stretching the central portion of said midregion to reduce the diameter thereof.

2. A method in accordance with claim 1 wherein the refractive index of said spacer fiber is less than the refractive index of the claddings of said optical fibers and is equal to or greater than the refractive index of that portion of said tube adjacent said bore, wherein the device excess loss is no greater than 0.5 dB and the slope of the curve of polarization dependent loss with respect to wavelength is no greater than 0.01 dB/nm.

3. A method in accordance with claim 2 wherein the refractive index of said spacer fiber is substantially equal to the refractive index of that portion of said tube adjacent said bore and wherein the device excess loss is no greater than 0.3 dB.

4. The method in accordance with claim 3 wherein the wavelength variation in excess loss at wavelengths between 1290 nm and 1600 nm is no greater than 0.1 dB.

5. A method in accordance with claim 2 wherein the composition of said spacer fiber is substantially the same as that of that portion of said tube adjacent said bore.

6. A method in accordance with claim 1 wherein, after the step of assembling, both of said active optical fibers extend from both ends of said tube.

7. A method in accordance with claim 1 wherein, after the step of assembling, one of said optical fibers extends from both ends of said tube, and one of said optical fibers extends from only one end of said tube.

8. A method in accordance with claim 1 wherein the diameter of said spacer fiber is the same as the diameters of said active optical fibers.

9. A method of making a fiber optic coupler comprising the steps of assembling a coupler preform including first and second active optical fibers and one spacer fiber, said optical fibers each having a core surrounded by a cladding, and said spacer fiber having a substantially uniform composition, said active fibers and said spacer fiber are arranged in a triangular array, heating a midregion of said coupler preform to fuse said fibers, and stretching the central portion of said midregion to reduce the diameter thereof, wherein the step of assembling comprises stripping protective coating from a first coated optical fiber such that it is composed of an uncoated portion that joins first and second coated portions, stripping protective coating from a portion of a second coated optical fiber, threading said first and second coated optical fibers into said bore until the uncoated portions thereof are located within said bore, and thereafter threading said one spacer fiber into said bore.

10. A method in accordance with claim 9 wherein the step of stripping protective coating from a portion of a second coated optical fiber comprises stripping coating from an end of said second coated optical fiber, said first coated optical fiber extending from both ends of said tube, and said second coated optical fiber extending from one end of said tube, and wherein the step of threading said one spacer fiber into said bore comprises threading said one spacer fiber into that end of said bore opposite the end from which said second optical fiber extends.

* * * * *